United States Patent
Burks

(10) Patent No.: US 9,363,772 B2
(45) Date of Patent: Jun. 7, 2016

(54) METHOD AND APPARATUS FOR REDUCING CALL SETUP DELAY

(71) Applicant: MOTOROLA SOLUTIONS, INC., Schaumburg, IL (US)

(72) Inventor: Janus P. Burks, Grapevine, TX (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 357 days.

(21) Appl. No.: 13/898,579

(22) Filed: May 21, 2013

(65) Prior Publication Data

US 2014/0349698 A1    Nov. 27, 2014

(51) Int. Cl.
*H04W 76/02* (2009.01)
*H04W 52/38* (2009.01)
*H04W 52/02* (2009.01)
*H04W 76/04* (2009.01)
*H04W 4/10* (2009.01)
*H04W 76/00* (2009.01)

(52) U.S. Cl.
CPC ........ *H04W 52/383* (2013.01); *H04W 52/0251* (2013.01); *H04W 76/025* (2013.01); *H04W 76/048* (2013.01); *H04W 4/10* (2013.01); *H04W 76/005* (2013.01); *Y02B 60/50* (2013.01)

(58) Field of Classification Search
CPC .......... H04W 52/383; H04W 52/0251; H04W 76/025; H04W 76/005; H04W 76/048; H04W 4/10; Y02B 60/50
USPC .................................. 455/517, 518, 522, 574
See application file for complete search history.

(56) References Cited

U.S. PATENT DOCUMENTS

| | | |
|---|---|---|
| 5,799,256 A | 8/1998 | Pombo et al. |
| 5,924,017 A | 7/1999 | Pinter et al. |
| 6,393,308 B1 | 5/2002 | Isomichi et al. |
| 7,092,721 B2 | 8/2006 | Harris et al. |
| 7,158,806 B2 | 1/2007 | Harris et al. |
| 7,197,328 B2 | 3/2007 | Hart et al. |
| 7,231,223 B2 | 6/2007 | May et al. |
| 7,330,733 B2 | 2/2008 | Harris et al. |

(Continued)

FOREIGN PATENT DOCUMENTS

WO    2011094503 A1    8/2011

OTHER PUBLICATIONS

PCT International Search Report Dated Aug. 5, 2014 for Counterpart Application PCT/US2014/035236.

*Primary Examiner* — Raymond Dean
(74) *Attorney, Agent, or Firm* — Daniel R. Bestor

(57) ABSTRACT

A power-saving enabled subscriber device operates in a low-power state in which at least one wireless link is disconnected from a wireless data network and in which the wireless link is periodically temporarily re-established to check for pending transmissions at a first reduced frequency before re-entering the disconnected state in response to finding no pending data transmissions. To reduce delays in setting up a new call to the subscriber device, and responsive to detecting an association, or change in association, of the subscriber device with one of (i) a particular geographic region, (ii) a particular role at a particular geographic region, and (iii) a particular talk group, the subscriber device transitioning the subscriber device to a higher-power state and transmitting data messages over the wireless link at a second increased frequency to cause the subscriber device to remain in a connected state more often compared to the low-power state.

20 Claims, 3 Drawing Sheets

(56) References Cited

U.S. PATENT DOCUMENTS

| | | |
|---|---|---|
| 7,398,096 B2 | 7/2008 | Harris et al. |
| 8,127,159 B1 * | 2/2012 | Chhabra et al. ............... 713/320 |
| 9,113,344 B1 * | 8/2015 | Lee ....................... H04W 24/00 |
| 2003/0186651 A1 | 10/2003 | Weston et al. |
| 2003/0190888 A1 | 10/2003 | Mangal et al. |
| 2007/0192439 A1 | 8/2007 | Bhaskaran |
| 2008/0020808 A1 | 1/2008 | Wang et al. |
| 2008/0280637 A1 * | 11/2008 | Shaffer et al. ................. 455/519 |
| 2009/0017856 A1 * | 1/2009 | Albertsson et al. ........... 455/518 |
| 2009/0029703 A1 * | 1/2009 | Turnbull et al. ............... 455/436 |
| 2011/0239011 A1 | 9/2011 | Waris et al. |
| 2012/0072751 A1 | 3/2012 | Das et al. |
| 2012/0124196 A1 | 5/2012 | Brisebois et al. |
| 2012/0200419 A1 * | 8/2012 | Nylund ..................... 340/686.1 |
| 2012/0322401 A1 * | 12/2012 | Collins ..................... 455/404.1 |
| 2014/0334465 A1 * | 11/2014 | Lee et al. ...................... 370/338 |

* cited by examiner

METHOD AND APPARATUS FOR REDUCING CALL SETUP DELAY

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a control terminal, base station, eNodeB, repeater, and/or access point. Such a RAN typically includes a system infrastructure which generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another or may be non-overlapping or partially or fully overlapping.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks. Communications in accordance with any one or more of these standards, or other standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive speech and data, herein referred to collectively as 'traffic information', in accordance with the designated protocol.

OMA-PoC, in particular, is a recent technology that enables familiar PTT and "instant on" features of conventional half duplex radios, but uses mobile subscriber devices operating over modern cellular telecommunications networks. Using PoC, wireless subscriber devices such as mobile telephones and notebook computers can function as PTT half-duplex radio devices for transmitting and receiving voice and/or data. Other types of PTT models and multimedia call models (MMCMs) are also available.

Floor control in an OMA-PoC session is generally maintained by a PTT server that controls communications between two or more wireless subscriber devices. When a user of one of the subscriber devices keys a PTT button, a request for permission to speak in the OMA-PoC session is transmitted from the user's device to the PTT server using, for example, a real-time transport protocol (RTP) message. If no other users are currently speaking in the PoC session, an acceptance message is transmitted back to the user's device and the user can then speak into a microphone of the device. Using standard compression/decompression (codec) techniques, the user's voice is digitized and transmitted using discrete voice data packets, such as according to RTP and internet protocols (IP), to the PTT server. The PTT server then transmits the voice data packets to other users of the PoC session, using for example a point to multipoint communication technique.

Group call interconnections may be made between wireless and/or wireline participants via the Internet or other wide area network, for example. Typically, members of groups for group calls are statically defined. That is, a user, or administrator working on behalf of the user, indicates to the switching and/or or radio network (perhaps at the PTT server) a list of participants of a talk group at the time of the call or in advance of the call. The group members could be provisioned in the network by the user or an agent, and then provided some form of group identity, for example, to make the call. Then, at a future time, an originating user may perform some signaling to indicate that he wishes to establish a communication session (e.g., group call) with each of the pre-designated participants in the defined talk group.

As many of these subscriber devices are small and portable, they rely upon a limited direct current (DC) battery supply to operate throughout the day. Given the limited amount of power that can be stored in a small form factor battery used by such subscriber devices, conserving power to extend battery life has emerged as an important design priority. As such, subscriber devices are conventionally configured to enter a low-power or power-save state during idle times, during which time the subscriber device may shut down one or more components, including wireless interfaces, thereby conserving battery power for when it is most needed. While utilization of this low-power state may provide power conservation, problems may arise in setting up a group call to a large group of subscriber devices over a wide-area network such as the Internet when many of those members may be in a lower-power state and may be difficult to reach.

For example, call setup for a subscriber device when a new group call is received, where the subscriber device is already active and in a "connected" state with its serving RAN (e.g., already has a data channel assigned), can normally be completed in less than 1 s. If, however, the subscriber device is in a low-power state and only periodically waking up and briefly checking a control channel for paging indications (e.g., new call notifications) before returning to its low-power state, call setup for group calls involving such a subscriber device can take on the order of 5-15 s. This delay becomes more meaningful and problematic when applied in situations such as first responder dispatches, where small delays in call setup time can be quite detrimental to the health and/or welfare of the people or property the first responders are protecting.

Accordingly, there is a need for an improved method and apparatus for reducing paging delay in a RAN that allows a subscriber device to anticipate the arrival or generation of new private or group calls, and prevent itself from entering a low-power state so as to improve call setup times under such circumstances.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
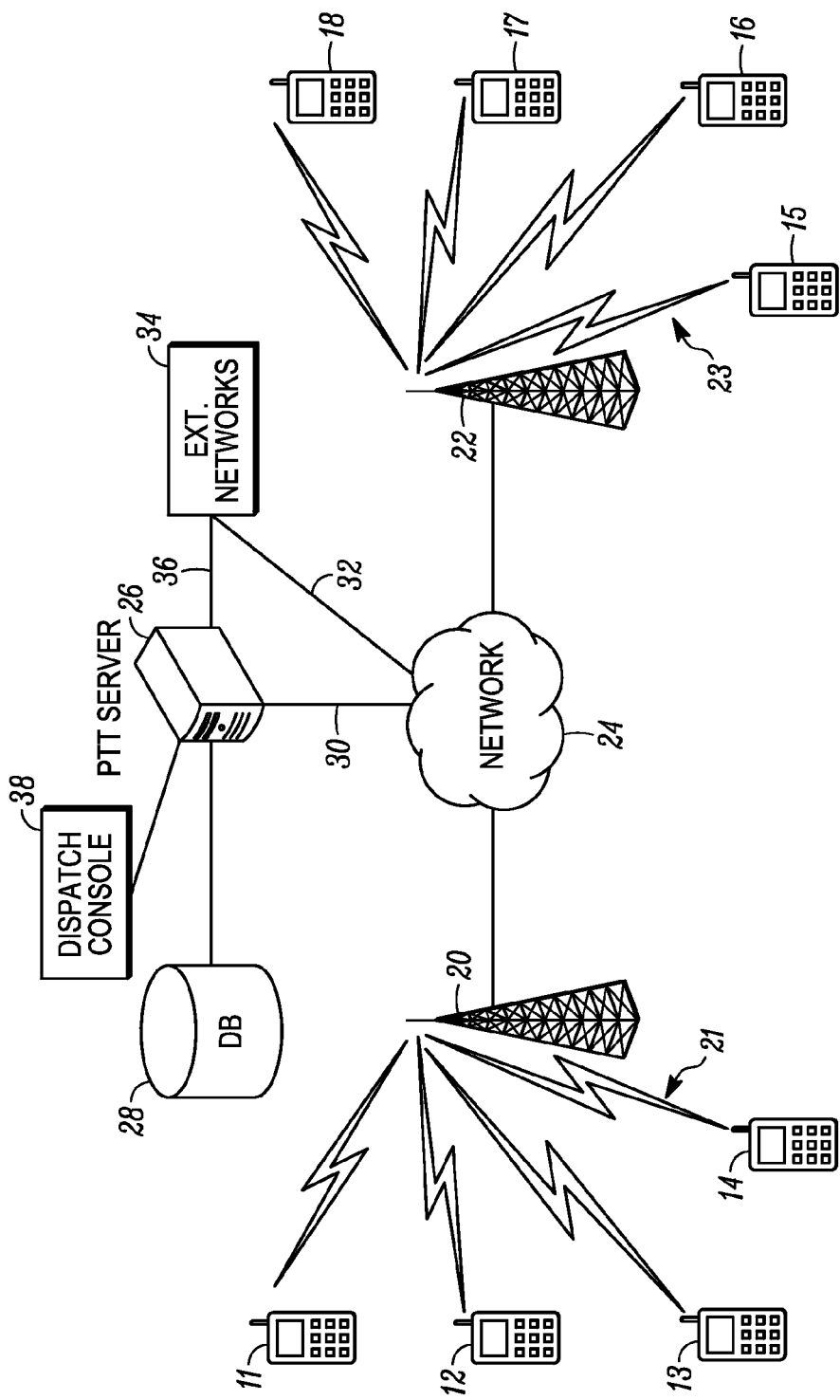
FIG. 1 is a block diagram of a communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for reducing call setup delays in a RAN that allows a subscriber device to anticipate the arrival of new private or group calls, and prevent itself from entering a low-power state so as to improve call setup times under such circumstances.

In one embodiment, a power-saving enabled subscriber device operates in a low-power state in which at least one wireless link is disconnected from a wireless data network and in which the wireless link is periodically temporarily re-established to check for pending transmissions at a first reduced frequency before re-entering the disconnected state in response to finding no pending data transmissions. To reduce delays in setting up a new call to the subscriber device, and responsive to detecting an association, or change in association, of the subscriber device with one of (i) a particular geographic region, (ii) a particular role at a particular geographic region, and (iii) a particular talk group, the subscriber device transitioning the subscriber device to a higher-power state and transmitting data messages over the wireless link at a second increased frequency to cause the subscriber device to remain in a connected state more often compared to the low-power state.

In another embodiment, a power-saving enabled subscriber device includes a memory, transceiver, and processor. The processor is configured to cause the subscriber device to operate in a low-power state in which at least one wireless link is disconnected from a wireless data network, via the transceiver, and in which the wireless link is periodically temporarily re-established, via the transceiver, to check for pending transmissions at a first reduced frequency before re-entering the disconnected state in response to finding no pending data transmissions. To reduce delays in setting up a new call to the subscriber device, and in response to detecting an association, or change in association, of the subscriber device with one of (i) a particular geographic region, (ii) a particular role at a particular geographic region, and (iii) a particular talk group, the processor causing the subscriber device to transition to a higher-power state and transmit data messages over the wireless link, via the transceiver, at a second increased frequency to cause the subscriber device to remain in a connected state more often compared to the low-power state.

Each of the above-mentioned embodiments will be discussed in more detail below, starting with example network and device architectures of the system in which the embodiments may be practiced, followed by a discussion of processes for reducing paging delay from a device perspective.

Further advantages and features consistent with this disclosure will be set forth in the following detailed description, with reference to the figures.

1. Network Architecture and Device Structure

FIG. 1 illustrates a communications network 10 including client subscriber devices (e.g., SDs) 11-18, fixed terminals 20, 22 (e.g. base stations), wireless links 21, 23, backhaul network 24, PTT server 26, database 28, communications connections 30, 32, 36, dispatch console 38, and external networks 34. Each base station 20, 22 has at least one radio transmitter covering a radio coverage cell (not shown). One or several SDs 11-18 within radio coverage of the base stations may connect to the base stations using a wireless communication protocol via wireless links 21, 23. The SDs 11-18 may communicate with each other, and perhaps other devices accessible via other network links, using a group communications protocol over wireless links 20, 22. Wireless links 21, 23 may be, for example, a wireless link supporting a protocol such as GPRS or UMTS, 2G, (e.g. GSM), 3G (e.g. WCDMA or LTE), iDEN, wireless LAN (WLAN), or ETSI Digital Mobile Radio (DMR). The SDs 11-18 may be configured with an identification reference (such as an IMSI, International Mobile Subscriber Identity) which may be connected to a physical media (such as a SIM card, Subscriber Identity Module).

Each SD 11-18 may be a group communications device, such as a push-to-talk (PTT) device, that is normally maintained in a monitor only mode, and which switches to a transmit-only mode (half-duplex) or transmit and receive mode (full-duplex) upon depression or activation of a PTT input switch. The group communications architecture in communications network 10 allows a single SD, such as SD 11, to communicate with one or more members (such as SDs 12-18) associated with a particular group of SDs at the same time. SDs 11-18, base stations 20, 22, and/or PTT server 26 may cooperate to define groups of SDs and enable the one-to-many communications feature provided by communications network 10.

Although only eight SDs and two base stations are illustrated in FIG. 1, the present disclosure is not limited as such, and more or fewer SDs and more or fewer base stations could be used in any particular implementation. Furthermore, while a single PTT server 26 is illustrated in FIG. 1, more than one PTT server 26 may be used and/or a distributed PTT server 26 may be used that divides functions across multiple devices, perhaps for load balancing reasons. Finally, while database 28 is illustrated as directly coupled to PTT server 26, database 28 may also be remote from PTT server 26 and accessible to PTT server 26 via one or more of network 24 and/or external networks 34.

The base stations 20, 22 may be linked to the PTT server 26 via network 24 and communications connection 30. Network 24 may comprise one or more base stations, routers, switches, LANs, WLANs, WANs, access points, or other network infrastructure. For example, PTT server 26 may be accessible to base stations 20, 22 via a dedicated wireline or via the Internet. In one example, base stations 20, 22 may be directly coupled to PTT server 26 via one or more internal links under control of a single communications network provider.

PTT server 26 may be a separate device configured to establish and/or provide group communications connections and services to SDs 11-18. In other embodiments, PTT server 26 may be embodied within or coupled to another network device, such as a base station controller (BSC), mobile switching center (MSC), site controller, zone controller, Push-to-Talk controller, or other network device. Database 28 may function to store mappings between SDs 11-18 and talk groups with which they are affiliated. The term 'talk group' is used in this specification to refer to a group of SD's. The term is not intended to be limited to voice communications, but rather, to embody all possible group communications payloads, including but not limited to, voice, data, video, audio, audio/video, images, and/or any other type of media stream. In addition to talk groups, database 28 may also include mappings that map a particular SD to an active (connected) status or an inactive (disconnected) status.

Furthermore, while the terms "group call" and "talk group" are used throughout the specification to refer to audio group call examples in a one-to-many group communication structure, in each example, the same or similar considerations can be applied to "group sessions" and "sessiongroups," respectively, when exchanging multimedia messages between group members. Such multimedia messages may include, but not be limited to, video, audio, audio/video, images, and any other type of media stream. Furthermore, the one-to-many group communication structure may utilize any one or more messaging protocols, including unicast, multicast, broadcast, or any combination thereof.

External networks 34 may also be accessible to base stations 20, 22 (and thus SDs 11-18) via network 24 and communications connection 32 and/or PTT server 26 and communications connections 30, 36. External networks 34 may include, for example, a public switched telephone network (PSTN), the Internet, or another wireless service provider's network, among other possibilities.

Communications system 10 may implement, in one embodiment, a narrow-band trunked radio communication system in which SDs 11-18 transmit control and data messages in accordance with an air interface protocol such as that defined by the ETSI Digital Mobile Radio (DMR) or APCO25 standards. In a trunked radio communication system, frequencies are assigned for talk group use on an as-needed basis, and signaling over a control channel is used to direct SDs to a particular channel to receive a particular group communication. In another embodiment, communications system 10 may implement a PTT over Cellular (OMA-PoC) or PTT over IP (PoIP) broadband architecture in which SDs 11-18 transmit control and data messages in accordance with a protocol such as real-time transport protocol (RTP) and/or session initiation protocol (SIP). Other possibilities exist as well.

Dispatch console 38 may be directly coupled to PTT server 26 as shown, or may be indirectly coupled to PTT server 26 via one or more of network 24 and external networks 34. The dispatch console 38 may provide an administrative or dispatch access to SDs 11-18 and PTT server 26, and allow an administrator or dispatcher to initiate infrastructure-sourced group communications to groups of SDs 11-18 as defined at the PTT server 26, among other features and functions.

Figure 2:
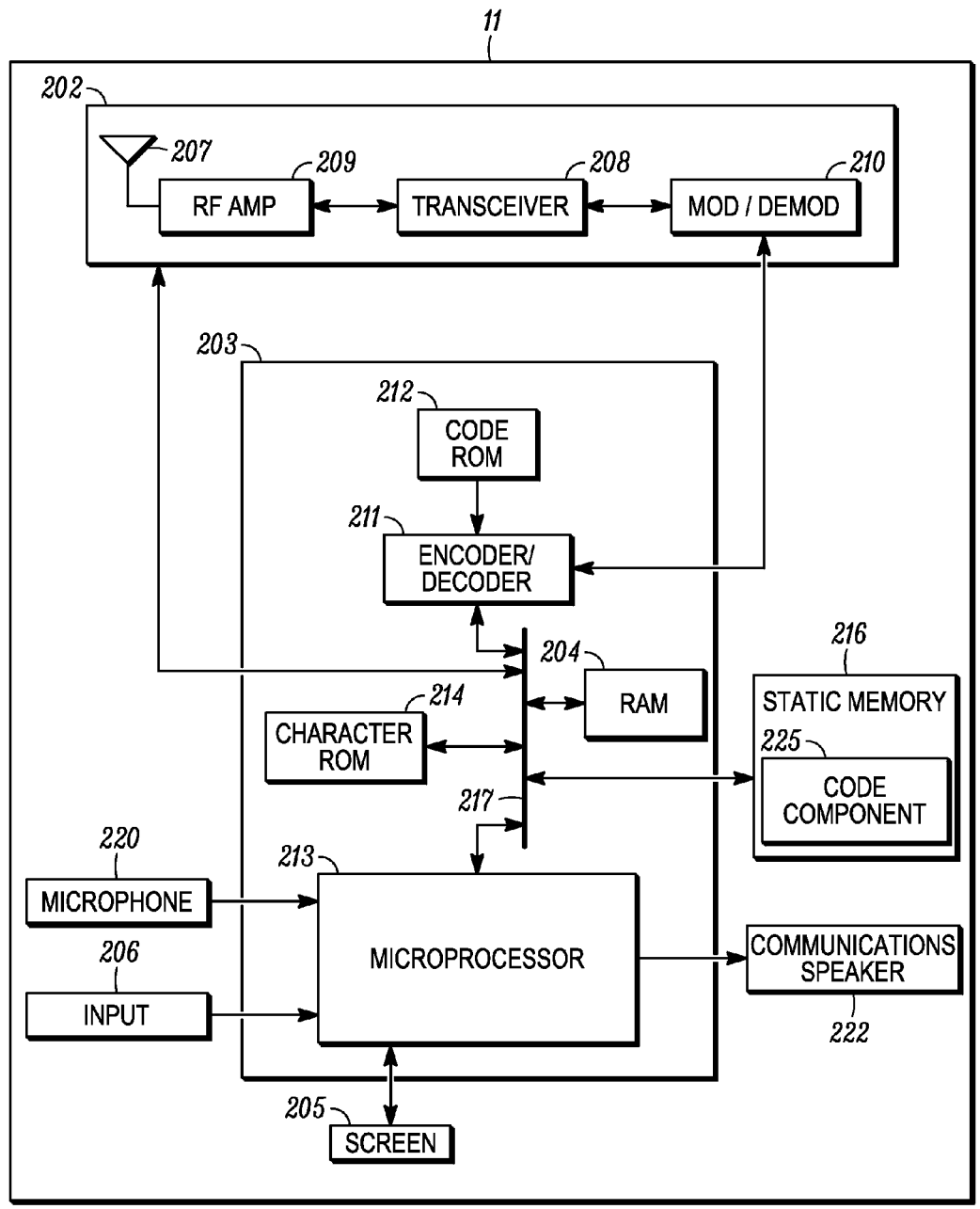
FIG. 2 is a block diagram of a subscriber device in accordance with some embodiments.

Referring to FIG. 2, a schematic diagram illustrates a SD 11 according to some embodiments of the present disclosure. It should be understood that SDs 12-18 may comprise same or similar elements to those disclosed in FIG. 2. As shown in FIG. 2, SD 11 comprises a radio frequency communications unit 202 coupled to a common data and address bus 217 of a processing unit 203. The SD 11 may also include an input 206 and a display screen 205, each coupled to be in communication with the processing unit 203. A microphone 220 captures audio from a user for encoding and transmission to other users, and a communications speaker 222 reproduces audio from encoded transmissions received from other users.

The processing unit 203 may also include an encoder/decoder 211 with an associated code Read Only Memory (ROM) 212 for storing data for encoding and decoding voice or other signals that may be transmitted or received by the SD 11. The processing unit 203 may further include a microprocessor 213 coupled, by the common data and address bus 217, to the encoder/decoder 211, a character ROM 214, a Random Access Memory (RAM) 204, and a static memory 216.

The radio frequency communications unit 202 is a combined receiver and transmitter (e.g., transceiver) having a common antenna 207. The radio frequency communications unit 202 has a transceiver 208 coupled to the antenna 207 via a radio frequency amplifier 209. The transceiver 208 is also coupled to a combined modulator/demodulator 210 that is coupled to the encoder/decoder 211.

The microprocessor 213 has ports for coupling to the keypad 206 and to the display screen 205. The microprocessor 213 further has ports for coupling to the microphone 220 and to the communications speaker 222. The character ROM 214 stores code for decoding or encoding data such as control channel messages and/or data or voice messages that may be transmitted or received by the SD 11. In some embodiments of the present disclosure, the static memory 216 can store operating code for the microprocessor 213 that, when executed by the microprocessor 213, perform the SD steps disclosed herein. For example, operating code stored in the static memory 216 may, when executed by microprocessor 213, cause the SD 11 to operate in a low-power state in which at least one wireless link is disconnected from a wireless data network and in which the wireless link is periodically temporarily re-established to check for pending transmissions at a first reduced frequency before re-entering the disconnected state when no pending data transmissions are found, and responsive to associating the SD 11 with one of (i) a particular geographic region, (ii) a particular role at a particular geographic region, and (iii) a particular talk group, transmit data messages over the wireless link at a second increased frequency to cause the SD 11 to remain in a connected state more often compared to the low-power state, in accordance with one or more of the steps set forth in FIG. 3. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

2. Process for Reducing Paging Delay

Figure 3:
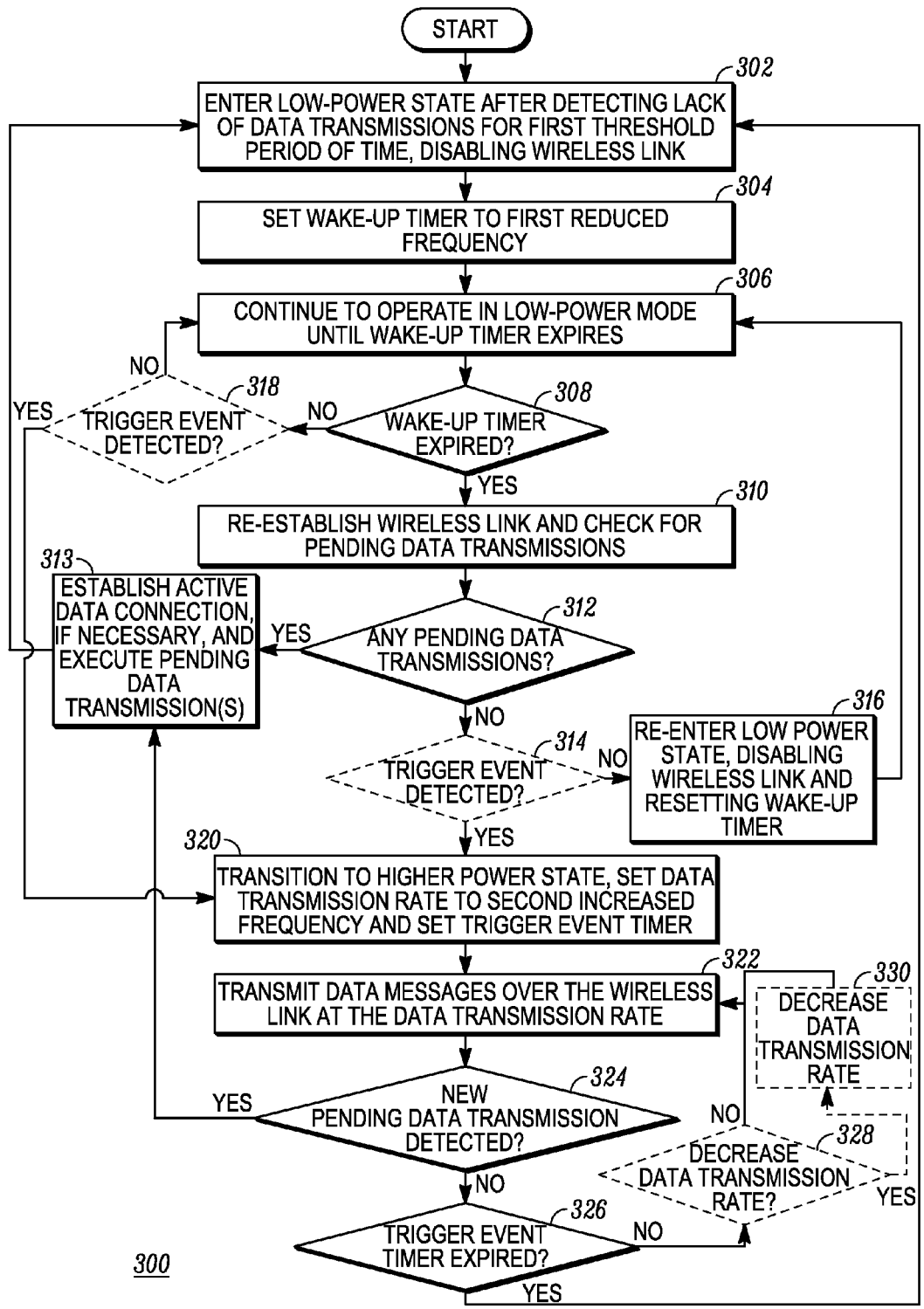
FIG. 3 is a flow chart illustrating a process that may be implemented at the subscriber device of FIG. 2 in accordance with an embodiment.

FIG. 3 sets forth a flow chart illustrating a process 300 that may be implemented at a subscriber device such as the SD 11 of FIG. 2 to reduce call setup time consistent with the present disclosure. Of course, additional steps not disclosed herein could be additionally added before, after, or in-between steps disclosed in FIG. 3, and the presence of such additional steps would not negate the purpose and advantages of the examples set forth in detail throughout the remainder of this disclosure. Steps drawn with a dashed outline in FIG. 3 should be understood to be optional steps.

Although not illustrated in FIG. 3, it is assumed that at least one talk group has already been created and affiliated with by a subscriber device prior to the first step 302. Talk groups could be set in advance by a user or administrator of the subscriber device or perhaps by a network operator or some other entity.

While a talk group may be created in any number of ways, in one example of setting up a talk group, a user of the subscriber device or perhaps a communications network operator may pre-define affiliated member subscriber devices with a particular group and assign the group a particular group ID (identification). A PTT server, such as PTT server 26 of FIG. 1, may store affiliation information that maps the subscriber devices with each particular group ID with which it is affiliated.

When the group has been created and its activation requested by the target user (or some other member of the new group), each of the identified members of the group are activated and called as in a typical group call. Each of the identified members of the group is informed that this is a group call and given the group ID by the PTT server and given the identity of the group call originator. Each of the identified members of the group may store the group ID provided so that, in the future, the group ID can be used to transmit a response to the group and/or to recognize future communications associated with the group. In other words, the identified members of the group may, in the future, reinitiate the group call after it has ended or may leave and rejoin an ongoing group call at will by using this group ID. The group ID stored by each of the participant target subscriber devices may remain valid until reallocated or invalidated by the PTT server. Optionally, each defined group and group ID may have associated with it a feature termed "time to live" (TTL). This indicates a time when reached which the group ID will expire and no longer be valid. During the time period from origination to expiration, any number of subscriber devices may join or leave the group, perhaps with or without permission from the group call originator or PTT server. Other ways of creating, maintaining, and using talk groups could be implemented as well.

In any event, at step 302, a subscriber device enters a low-power state after detecting a lack of data transmissions for a first threshold period of time. Entering the low-power state could include taking any number of battery-saving actions, including at least the disabling of a wireless link such as wireless link 21 of FIG. 1 connecting the subscriber device with a serving wireless network. The first threshold period of time may be, for example, 5-20 seconds. Disabling the wireless link may include disabling one or more of a receiver and transmitter portion of a transceiver such as transceiver 208 of FIG. 2, and/or one or more associated transceiver circuit elements such as RF amplifier 209 and modulator/demodulator 210. In addition to disabling a wireless link, other elements of the subscriber device may be disabled or placed into a low-power operating mode, including disabling portions of a processor such as microprocessor 213, reducing an operating speed of the processor, reducing a brightness or disabling a display such as screen 205, and/or halting processing of input signals received via a microphone such as via microphone 220. Other possibilities exist as well.

Detecting a lack of data transmissions may include a lack of actual inbound and outbound data transmissions and/or a lack of scheduled inbound and outbound data transmissions. For example, the subscriber device can determine whether it has any actual outbound data transmissions, and whether there are any outbound data transmissions queued for transmission that are perhaps waiting for available RF resources or for a currently ongoing data transmission to complete. Furthermore, the subscriber device can determine whether it has any actual inbound data transmissions, and whether there are any scheduled inbound data transmissions by perhaps monitoring a control channel in the system for announced calls that indicate the subscriber device as an intended recipient.

At step 302, and for the purposes of illustrating disclosed embodiments, it is assumed that the subscriber device detects a lack of data transmissions and enters the low-power state, disabling its wireless link with the serving RAN.

At step 304, and responsive to entering the low-power state, the subscriber device sets a wake-up timer to a first reduced frequency. The wake-up timer is intended to cause the subscriber device to wake up upon expiration, re-enabling the wireless link and checking to see if there are any pending inbound calls to the subscriber device (e.g., private calls or group calls). The subscriber device may also determine at that time whether any outbound transmissions are queued at the subscriber device, and if so, request and obtain a wireless data link with the RAN to transmit the queued outbound transmissions. In other embodiments, interrupts may provide an alternate mechanism to wake the subscriber device from its low-power mode in order to transmit pending outbound transmissions. The first reduced frequency may be set, for example, to 5-15 seconds, and is considered "reduced" relative to a subsequently described increased frequency set forth below.

At step 306, the subscriber device continues to operate in the low-power mode until the wake-up timer expires (assuming no other event, such as an internal interrupt, brings the subscriber device out of its low-power mode first). At step 308, the subscriber device determines whether the wake-up timer has expired. If the wake-up timer has expired, processing proceeds to step 310, where the subscriber device re-establishes its wireless link with the RAN and checks for pending data transmissions. For example, the subscriber device may re-establish an LTE connection with its serving RAN, and check one or more of a paging control channel (PCCH), a common control channel (CCCH), and a dedicated control channel (DCCH) for information regarding pending data transmissions intended for the subscriber device. Also at step 310, and as discussed earlier, the subscriber device may also determine whether any outbound transmissions are queued at the subscriber device for transmission to the RAN.

At step 312, the subscriber device determines whether there is any indication of pending data transmissions (subscriber device to RAN or RAN to subscriber device) that would necessitate the establishment of a data connection with the RAN. If there are pending data transmissions, processing proceeds to step 313, where the subscriber device establishes an active data connection with the RAN and begins transmitting and/or receiving in accordance with the pending data transmissions. For example, the subscriber device may re-establish an LTE connection with its serving RAN, and receive and/or transmit the pending data transmission(s) over a dedicated traffic channel (DTCH) or multicast traffic channel (MTCH).

Returning to step 312, and assuming that the subscriber device determines that there are no pending data transmissions, processing proceeds to optional step 314, where the subscriber device determines whether a trigger event has been detected. Trigger events include a detected association, or change in association, of the subscriber device with respect to one of (i) a particular geographic region, (ii) a particular role at a particular geographic region, and (iii) a particular talk group.

An association, or change in association, of the subscriber device with respect to a particular geographic region may include the subscriber device detecting entry into a pre-defined incident site or geographic region or exit from a pre-defined incident site or geographic region. For example, the subscriber device may be pre-configured with, or provided over-the-air with, particular geographic regions or incident sites. The particular geographic regions or incident sites may be described in terms of a geo-fence, and may be defined as a single geographic point (e.g., GPS location or other cartographic coordinate) and radius, or as a plurality of borders that define a regularly or irregularly shaped interior incident site between them. A location determination circuit, which may include a specifically configured processor such as microprocessor 213 and/or a separate dedicate GPS receiver, may use a current geographic location of the subscriber device provided by the GPS receiver and/or provided via a triangulation process executed by the processor, and compare the provided current geographic location to the defined borders of the particular geographic regions and/or incident sites. Once entry into a defined geographic region or passage across a defined border is detected by the subscriber device, a trigger event may be generated at step 314 signaling that data communications are more likely to occur, and in order to decrease call setup times in this situation, the subscriber device should remain in a connected state (via the wireless link) more often compared to the low-power state of step 302. Similar methods may be used to detect exit from the defined geographic region.

An association, or change in association, of the subscriber device with a particular geographic region may additionally or alternatively include the subscriber device detecting an instruction to proceed to an identified incident location or the subscriber device detecting receipt of an indication of a new or different geographic destination via a user interface such as input 206 of SD 11 in FIG. 2. For example, the subscriber device may be provided over-the-air with the incident location, perhaps from a dispatch console such as dispatch console 38 of FIG. 1, or provided with the incident location via a mapping software and user interface at the subscriber device. The incident location may be associated with a particular event, such as a fire or medical emergency that the user of the subscriber device has been dispatched to. Once receipt of the instruction or input to proceed to the defined incident location is detected by the subscriber device, a trigger event may be generated at step 314 signaling that data communications are more likely to occur, and in order to decrease call setup times in this situation, the subscriber device should remain in a connected state (via the wireless link) more often compared to the low-power state of step 302.

An association, or change in association, of the subscriber device with a particular role at a particular geographic region may include the subscriber device detecting receipt of an indication of a new role via a user interface such as input 206 of SD 11 in FIG. 2, or receipt of an over-the-air instruction, perhaps from a dispatch console such as dispatch console 38 of FIG. 1, assigning the subscriber device a new role. The new role may be, for example, direct incident response, crowd control, traffic control, medical response, fire response, sales, service, technical support, warehouse, truck driver, taxi driver, nurse, hospital support staff, forestry worker, and manufacturing line, or some other first responder or other type of role that the user and associated subscriber device are to take in responding to a particular incident at a particular geographic area or incident scene or in performing some service or project at or along a particular geographic area. The role may be indicated via an encoded text string or via an identifier that is associated with or mapped to a particular role. Once receipt of the new or changed role is detected (via the user interface or over-the-air), a trigger event may be generated at step 314 signaling that data communications are more likely to occur, and in order to decrease call setup times in this situation, the subscriber device should remain in a connected state (via the wireless link) more often compared to the low-power state of step 302.

An association, or change in association, of the subscriber device with a particular talk group may include the subscriber device detecting receipt of a talk group change or assignment via a user interface such as input 206 of SD 11 in FIG. 2, or receipt of an over-the-air instruction, perhaps from a dispatch console such as dispatch console 38 of FIG. 1, changing the subscriber device's talk group membership, assigning the subscriber device to a new talk group, logging into a previously subscribed talk group, or indicating a change in the active members of a previously subscribed talk group. The new talk group may be associated with, for example, a police talk group, a fire fighter talk group, a medical response talk group, a federal agency talk group, a retail response talk group, a manufacturing response talk group, a transportation services talk group, or some other talk group with which the subscriber device wishes to or is instructed to be associated with. In other embodiments, color codes may be used to identify particular talk groups, among other possibilities. Once receipt of the new or changed talk group or active membership is detected (via the user interface or over-the-air), a trigger event may be generated at step 314 signaling that data communications are more likely to occur, and in order to decrease call setup times in this situation, the subscriber device should remain in a connected state (via the wireless link) more often compared to the low-power state of step 302.

If no trigger event is detected at the subscriber device at step 314, processing proceeds to step 316, where the subscriber device re-enters the low-power state including disabling the wireless link that was re-established at step 310 and resetting the wake-up timer based on the first reduced frequency. Subsequently, processing returns to step 306.

Returning to step 314, in addition or as an alternative to checking for trigger events at optional step 314, trigger events may also be detected at optional step 318 while the subscriber device is in the low-power state and prior to the wake-up timer expiring and re-establishing the wireless link at step 310. Of course, because the wireless link is disabled at optional step 318, trigger events cannot be detected via the disabled wireless link. Accordingly, trigger events detected at step 318 may be limited to trigger events that are originally generated at the subscriber device (e.g., via a user interface such as input 206 of SD 11 of FIG. 2) or received via a second non-disabled wireless link separate from the disabled wireless link. The second non-disabled wireless link could be of a different type of wireless link than the disabled wireless link, and may use a different protocol and/or have a different range. Furthermore, steps 314 and 318 are optional in the sense that the trigger event detection may be executed at either one or both steps in the process 300. However, at least one of steps 314 and 318 is always executed in the embodiments disclosed herein.

Once a trigger event is detected at either step 314 or 318, processing proceeds to step 320, where the subscriber device transitions to a higher-power state (compared to the low-power state of step 306) and steps are taken to ensure that the subscriber device remains in a connected state (e.g., via the wireless link) more often compared to the low-power state of step 302.

For example, at step 320, a data transmission rate is set to a second increased frequency compared to the first reduced frequency of the wake-up timer set in step 304. More specifically, data transmissions are scheduled to be transmitted at step 320 at a pre-determined second increased frequency to ensure that the wireless link remains in a connected state more often compared to the low-power state. By setting the pre-determined second increased frequency to be at least more frequent than the first reduced frequency that caused the subscriber device to periodically wake up and check for pending data transmissions at step 310, the subscriber device can ensure that it remains in a connected state more often compared to the low-power state and, as a result, call setup times are reduced. For example, while the first reduced frequency was set at 5-15 seconds, thereby causing the subscriber device to exit out of the low-power state and re-establish the wireless link at least once every 5-15 seconds, the second increased frequency may be set less than the first reduced frequency to ensure that the wireless link is established for an overall greater amount of time, thereby increasing the chances that a call can be setup with the wireless device more quickly while the wireless link is already established. In one embodiment, the second increased frequency may be set in the range of 1-10 seconds.

Also at step 320, a trigger event timer is set. The trigger event timer controls how long the subscriber device remains in the higher-power state responsive to the detected trigger event. The trigger event timer may be set to a value such as, for example, 5-30 minutes.

While in the higher-power state, the time that the subscriber device spends in the wireless link established state will depend, at least partially, on the frequency of the data transmissions, and the speed with which the subscriber device is configured to return to the low-power state after detecting an active data transmission over the wireless link. For example, in an embodiment in which the subscriber device is configured to return to the low-power state after a threshold period of time between 10 and 20 seconds without seeing a data transmission, setting the second increased frequency in the range of 1-10 seconds will effectively cause the subscriber device to maintain the wireless link indefinitely, or at least until some other event causes the data transmission rate to be reduced or the data transmissions halted entirely.

At step 322, the data messages are transmitted over the wireless link at the data transmission rate. For example, the subscriber device may receive and/or transmit data messages over a data channel (DTCH or MTCH) of an LTE air interface wireless link. The data messages may be, for example, ping messages or null data messages that consume a relatively small amount of bandwidth and transmit power. At step 324, the subscriber device determines whether any new pending data transmissions are detected. Pending incoming data transmissions may be indicated via a message (paging or otherwise) transmitted over the data channel or control channel of the wireless link. Pending outgoing data transmissions may be tracked internally at the subscriber device, perhaps via some internally generated trigger or interrupt at the subscriber device. The new pending data transmission may be, for example, a pending new private or group voice or data call intended for the subscriber device or a group to which the subscriber device is subscribed. If a new pending data transmission is detected at step 324, processing proceeds to step 313, where the subscriber device uses the already-established data connection and begins transmitting and/or receiving in accordance with the pending data transmissions.

Returning to step 324, in the event that no new pending data transmissions are detected, the subscriber device determines if the trigger event timer has expired. If the trigger event timer has expired, e.g., the subscriber device has remained in the higher-power state for the amount of time reflected by the trigger event timer (e.g., 5-30 minutes as set forth above) without detecting any new pending data transmissions, processing proceeds back to step 302, where the subscriber device re-enters the low-power state and disables the wireless link.

If, on the other hand, the subscriber device determines that the trigger event timer has not expired at step 326, processing proceeds back to step 322 through two optional steps 328-330. At optional step 328, the subscriber device determines whether the data transmission rate should be decreased. In one embodiment, the subscriber device may be configured to apply a back-off interval that decreases the data transmission rate below the second increased frequency, but still above the first reduced frequency, to slowly bring the subscriber device closer to the low-power state while still maintaining a higher availability compared to the low-power state. For example, an algorithm may be applied that continuously varies the data transmission rate according to the equation Next Data Transmission=$k*delta_{interval}$, where $delta_{interval}$ is a predefined fixed value that may be set in the range of, for example, 1-60 s, while the integer k is a random number chosen between 1 and n, where n is the number of previous data transmissions already sent at step 322.

Other back-off algorithms could be used as well. For example, after transmitting data messages at step 322 at the second increased frequency for a first period of time without detecting new pending data transmissions at step 324, the data transmission rate may be reduced slightly to a third increased frequency that is less than the second increased frequency but still more than the first reduced frequency. Then, after transmitting data messages at step 322 at the third increased frequency for a second period of time without detecting new pending data transmissions at step 324, the data transmission rate may be again reduced slightly to a fourth increased frequency that is less than the third increased frequency but still more than the first reduced frequency. In one embodiment, the first period of time may be in the range of 2-10 minutes and the second period of time in the range of 5-15 minutes.

In any event, and in accordance with any of the preceding back-off algorithms or other possible back-off algorithms, if it is determined that the data transmission rate should not be decreased at step 328, processing proceeds back to step 322, where the next data transmission is transmitted in accordance with the data transmission rate. If, on the other hand, it is determined at step 328 that the data transmission rate should be decreased, processing proceeds to step 330, where the data transmission rate is decreased, before proceeding back to step 322 where the next data transmission is transmitted in accordance with the decreased data transmission rate.

3. Conclusion

In accordance with the foregoing, an improved method and apparatus for reducing call setup delay in a RAN that allows a subscriber device to anticipate the initiation of new private or group calls, and prevent itself from entering a low-power state so as to improve call setup times under such circumstances, is disclosed. As a result, a more power efficient, robust, and adaptable communications system can be provided, improving call setup times and communication capabilities of incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for reducing delays in setting up a new call to a power-saving enabled subscriber device by detecting a trigger event indicating future data communications are more likely to occur, the method comprising:

the subscriber device operating in a low-power state in which at least one wireless link is disconnected from a wireless data network and in which the wireless link is periodically temporarily re-established to check for pending transmissions at a first reduced frequency before re-entering the disconnected state in response to finding no pending data transmissions; and responsive to the subscriber device detecting a trigger event indicating future data communications are more likely to occur, the trigger event being one selected from: (i) the subscriber device detecting that the subscriber device has entered or exited a particular incident site as defined in a geo-fence and associated with an incident occurrence, (ii) the subscriber device detected that it has been instructed to proceed to a particular geographic incident location defined at the subscriber device and associated with an incident occurrence, (iii) the subscriber device detecting a new association, or change in existing association, of the subscriber device with a particular role at a particular geographic region associated with an incident occurrence, and (iv) the subscriber device detecting a new association, or change in existing association, of the subscriber device with a particular talk group, the subscriber device transitioning the subscriber device to a higher-power state and the subscriber device transmitting data messages over the wireless link at a second increased frequency to cause the subscriber device to remain in a connected state more often compared to the low-power state.

2. The method of claim 1, wherein the step of transmitting the data messages at the second increased frequency is responsive to detecting that the subscriber device has entered the particular incident site associated with the incident occurrence.

3. The method of claim 2, wherein the subscriber device detecting entry into the incident site comprises the subscriber device determining its geographic location via one of a triangulation process and a global positioning system (GPS) receiver, comparing its determined geographic location to the geo-fence defined at the subscriber device and associated with the incident site, and determining that its current location is within the boundaries of the geo-fence.

4. The method of claim 1, wherein the step of transmitting the data messages at the second increased frequency is responsive to detecting that the subscriber device has been instructed to proceed to the particular geographic region defined at the subscriber device, wherein the instruction to proceed to the particular geographic region is an instruction to proceed to a new or different defined geographic destination.

5. The method of claim 4, wherein the defined geographic destination is received over the air from a dispatch console.

6. The method of claim 4, wherein the defined geographic destination is entered via a user interface at the subscriber device.

7. The method of claim 1, wherein the step of transmitting the data messages at the second increased frequency is responsive to detecting the new association, or change in existing association, of the subscriber device with the particular role at the particular geographic region.

8. The method of claim 7, wherein the particular role is selected from the group comprising direct incident response, traffic control, crowd control, medical response, fire response, sales, service, technical support, warehouse, truck driver, taxi driver, nurse, hospital support staff, forestry worker, and manufacturing line.

9. The method of claim 1, wherein the step of transmitting the data messages at the second increased frequency is responsive to detecting the new association, or change in existing association, of the subscriber device with the particular talk group.

10. The method of claim 9, wherein the step of detecting the new association, or change in existing association, of the subscriber device with the particular talk group comprises one of receiving an instruction over the air to associate with the particular talk group indicated in the instruction and receiving a user input via an input of the subscriber device specifying to subscribe to the particular talk group.

11. The method of claim 9, wherein the step of detecting the new association, or change in existing association, of the subscriber device with the particular talk group comprises one of (i) receiving an instruction over the air to disassociate with the particular talk group indicated in the instruction, (ii) receiving a user input via an input of the subscriber device specifying to disassociate with the particular talk group, and (iii) receiving an indication over the air that the active membership of the particular talk group indicated in the instruction has changed.

12. The method of claim 1, further comprising, after transmitting the data messages over the wireless link at the second increased frequency for a first period of time, and responsive to failing to detect any new calls destined for the subscriber device during the first period of time, transmitting second data messages over the wireless link at a third frequency, less than the second frequency but greater than the first frequency, to cause the subscriber device to remain in a connected state more often compared to the low-power state but less often than when transmitting data messages at the second frequency.

13. The method of claim 1, wherein the wireless link is operated in compliance with one of an open media alliance (OMA) push to talk (PTT) over cellular (OMA-PoC) standard, a voice over IP (VoIP) standard, and a PTT over IP (PoIP) standard.

14. The method of claim 1, wherein the data messages transmitted at the second increased frequency comprise one of ping messages and null messages.

15. A power-saving enabled subscriber device operating in a wireless communications network and capable reducing delays in setting up a new call by detecting a trigger event indicating future data communications are more likely to occur, the subscriber device comprising:
a memory;
a transceiver; and
a processor configured to:
cause the subscriber device to operate in a low-power state in which at least one wireless link is disconnected from a wireless data network, via the transceiver, and in which the wireless link is periodically temporarily re-established, via the transceiver, to check for pending transmissions at a first reduced frequency before re-entering the disconnected state in response to finding no pending data transmissions; and
in response to detecting a trigger event indicating future data communications are more likely to occur, the trigger event being one selected from: (i) detecting that the subscriber device has entered or exited a particular incident site as defined in a geo-fence and associated with an incident occurrence, (ii) the subscriber device detected that it has been instructed to proceed to a particular geographic incident location defined at the subscriber device and associated with an incident occurrence, (iii) detecting a new association, or change in existing association, of the subscriber device with a particular role at a particular geographic region associated with an incident occurrence, and (iv) detecting a new association, or change in existing association, of the subscriber device with a particular talk group, cause the subscriber device to transition to a higher-power state and to transmit data messages, via the transceiver, over the wireless link at a second increased frequency to cause the subscriber device to remain in a connected state more often compared to the low-power state.

16. The power-saving enabled subscriber device of claim 15, wherein the processor is further configured to transmit the data messages at the second increased frequency in response to detecting that the subscriber device has entered the particular incident site associated with the incident occurrence.

17. The power-saving enabled subscriber device of claim 15, wherein the processor is further configured to transmit the data messages at the second increased frequency in response to detecting that the subscriber device has been instructed to proceed to the particular geographic region defined at the subscriber device, wherein the instruction to proceed to the particular geographic region is an instruction to proceed to a new or different defined geographic destination.

18. The power-saving enabled subscriber device of claim 15, wherein the processor is further configured to transmit the data messages at the second increased frequency in response to detecting the new association, or change in existing association, of the subscriber device with the particular role at the particular geographic region.

19. The power-saving enabled subscriber device of claim 15, wherein the processor is further configured to transmit the data messages at the second increased frequency in response to detecting the new association, or change in existing association, of the subscriber device with the particular talk group.

20. The power-saving enabled subscriber device of claim 15, wherein the processor is further configured to, after causing the subscriber device to transmit data messages, via the transceiver, over the wireless link at the second increased frequency for a first period of time, and responsive to failing to detect, via the transceiver, any new calls destined for the subscriber device during the first period of time, transmit second data messages, via the transceiver, over the wireless link at a third frequency, less than the second frequency but greater than the first frequency, to cause the subscriber device to remain in a connected state more often compared to the low-power state but less often than when transmitting data messages at the second frequency.

* * * * *